(12) United States Patent
McClintock et al.

(10) Patent No.: US 7,681,936 B2
(45) Date of Patent: Mar. 23, 2010

(54) LOAD FLOOR WITH GEAR RACK

(75) Inventors: Steven D. McClintock, South Lyon, MI (US); Daniel V. Beckley, Byron, MI (US)

(73) Assignee: Magna International Inc., Aurora (CA)

( * ) Notice: Subject to any disclaimer, the term of this patent is extended or adjusted under 35 U.S.C. 154(b) by 453 days.

(21) Appl. No.: 11/675,314

(22) Filed: Feb. 15, 2007

(65) Prior Publication Data

US 2007/0187970 A1      Aug. 16, 2007

Related U.S. Application Data

(60) Provisional application No. 60/773,935, filed on Feb. 16, 2006.

(51) Int. Cl.
*B60J 7/00* (2006.01)

(52) U.S. Cl. ............... 296/37.14; 296/26.08; 296/37.16

(58) Field of Classification Search ............... 296/37.14, 296/37.16, 26.08, 26.09, 39.2, 184.1
See application file for complete search history.

(56) References Cited

U.S. PATENT DOCUMENTS

| 3,871,534 | A | 3/1975 | Bursk |
| 5,544,998 | A | 8/1996 | Malinowski |
| 6,312,034 | B1 | 11/2001 | Coleman, II et al. |
| 6,338,518 | B1 | 1/2002 | D'Annunzio et al. |
| 6,464,274 | B2 | 10/2002 | Mink et al. |
| 6,503,036 | B1 | 1/2003 | Bequette et al. |
| 6,517,137 | B2 | 2/2003 | Kiester et al. |
| 6,808,217 | B2 | 10/2004 | Nick et al. |
| 6,976,720 | B1 | 12/2005 | Bequette |
| 7,393,037 | B2 * | 7/2008 | Hwang .................... 296/37.14 |
| 2001/0036396 | A1 | 11/2001 | Haid et al. |
| 2002/0140245 | A1 | 10/2002 | Coleman, II et al. |
| 2004/0151566 | A1 | 8/2004 | Nick et al. |
| 2005/0002768 | A1 | 1/2005 | Nick et al. |
| 2005/0008466 | A1 | 1/2005 | Albrecht et al. |
| 2005/0285422 | A1 | 12/2005 | Bartos et al. |
| 2006/0033353 | A1 | 2/2006 | Bequette |
| 2006/0125267 | A1 | 6/2006 | Stevenson et al. |

FOREIGN PATENT DOCUMENTS

| WO | WO98/45143 | 10/1998 |
| WO | WO01/53131 | 7/2001 |

* cited by examiner

*Primary Examiner*—Joseph D Pape
(74) *Attorney, Agent, or Firm*—Honigman Miller Schwartz and Cohn LLP

(57) ABSTRACT

A movable cargo floor assembly for a vehicle providing at least a portion of the cargo floor moving closer to an entrance of the vehicle or extending beyond or outside the vehicle when it is in a deployed position, and the cargo floor being in a stowed position when not in the deployed position. In addition, the cargo floor has at least one ramp surface integrated into the base of the cargo floor, and a track that is integrated into the ramp surface so that a gear assembly contacts the track and moves the cargo floor to and from a deployed position and a stowed position. Thus, as a gear rotates it contacts the teeth of the track and causes the cargo floor to move between positions.

20 Claims, 3 Drawing Sheets

LOAD FLOOR WITH GEAR RACK

RELATED APPLICATIONS

This application claims the benefit of earlier filed U.S. Provisional Application Ser. No. 60/773,935, filed Feb. 16, 2006, which is incorporated herein by reference in its entirety.

FIELD OF THE INVENTION

The present invention relates to a cargo floor of a vehicle which moves between a stowed position and a deployed position.

BACKGROUND

Almost all vehicles have an area in the passenger compartment designated for transporting cargo or a trunk area designated for transporting cargo. In some vehicle models, such as mini vans or SUVs, it is ideal to have a larger cargo area inside the passenger compartment so that more cargo or large cargo can be transported in the vehicle. However, when a vehicle has a large cargo area, it can be difficult and not ergonomically ideal to place objects in hard to reach areas of the cargo area. For example, in a mini van the portions of the cargo area that are farthest away from the rear hatch can be difficult to reach from outside the vehicle. Thus, if a person wishes to place cargo in the hard to reach area of the cargo area, they have limited options in order to get the cargo in the desired location.

One option is for the person to put the cargo partially in the cargo area and then enter the vehicle to get on the other side of the cargo area. This is not ideal because the person has to change locations in order to get the cargo into the vehicle, and in most models of vehicles, the person would have to stretch over a row of seating in the vehicle. Another option is to stretch across the cargo area from outside the vehicle. This is not ideal because the person must get close to the vehicle and most likely contact the exterior side of the vehicle. This can result in the person getting dirty from the road dirt or other byproducts on the exterior of the vehicle. Additionally, when the cargo to be stored is a heavy object it is not ergonomically ideal to stretch across a large cargo area with heavy cargo, even if the person has the strength to move the cargo in that manner.

Therefore, it would be desirable to develop a load floor for a vehicle in which the floor is repositioned from a stowed position to a deployed position so that a person can place cargo on the portion of the load floor farthest from the opening in the vehicle, without reaching across the entire cargo area. In addition, it would be desirable to integrate the track in which the load floor moves along into the base of the load floor in order to reduce the number of parts needed for operation, and thus making the manufacturing and assembly of the load floor more efficient.

SUMMARY

The present invention relates to a movable cargo floor for a vehicle wherein at least a portion of the cargo floor moves between a stowed position and a deployed position. When the cargo floor is in the deployed position it is closer to an entrance point of the vehicle than when in the stowed position or at least partially outside the vehicle. In addition, the cargo floor has at least one ramp surface integrated into the base of the floor, and a frictional element contacting the ramp surface. As the frictional element rotates, the frictional element causes the cargo floor to move between the stowed and deployed positions. Also, the ramp surface can have a track that is integrated into the ramp surface so that a gear assembly in the vehicle contacts the track and moves the cargo floor to and from a deployed position and a stowed position. Thus, as the gear assembly rotates, it contacts a plurality of teeth integrated into the track and causes the floor to move between positions.

As the floor moves between positions the ramp surface integrated into the base causes the height of the cargo floor with respect to the floor portion of the vehicle to increase and decrease. Thus, the cargo floor has a top surface that is over even with the floor portion of the vehicle when in the stowed position, but the cargo floor is at a greater height than the floor portion when in the deployed position. The gear assembly comprises a control unit that is used to command a drive mechanism which turns a shaft that is operably connected to any number of gears. Furthermore, the control unit can be controlled by electrical signals through electrical wiring or a wireless signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

Figure 1:
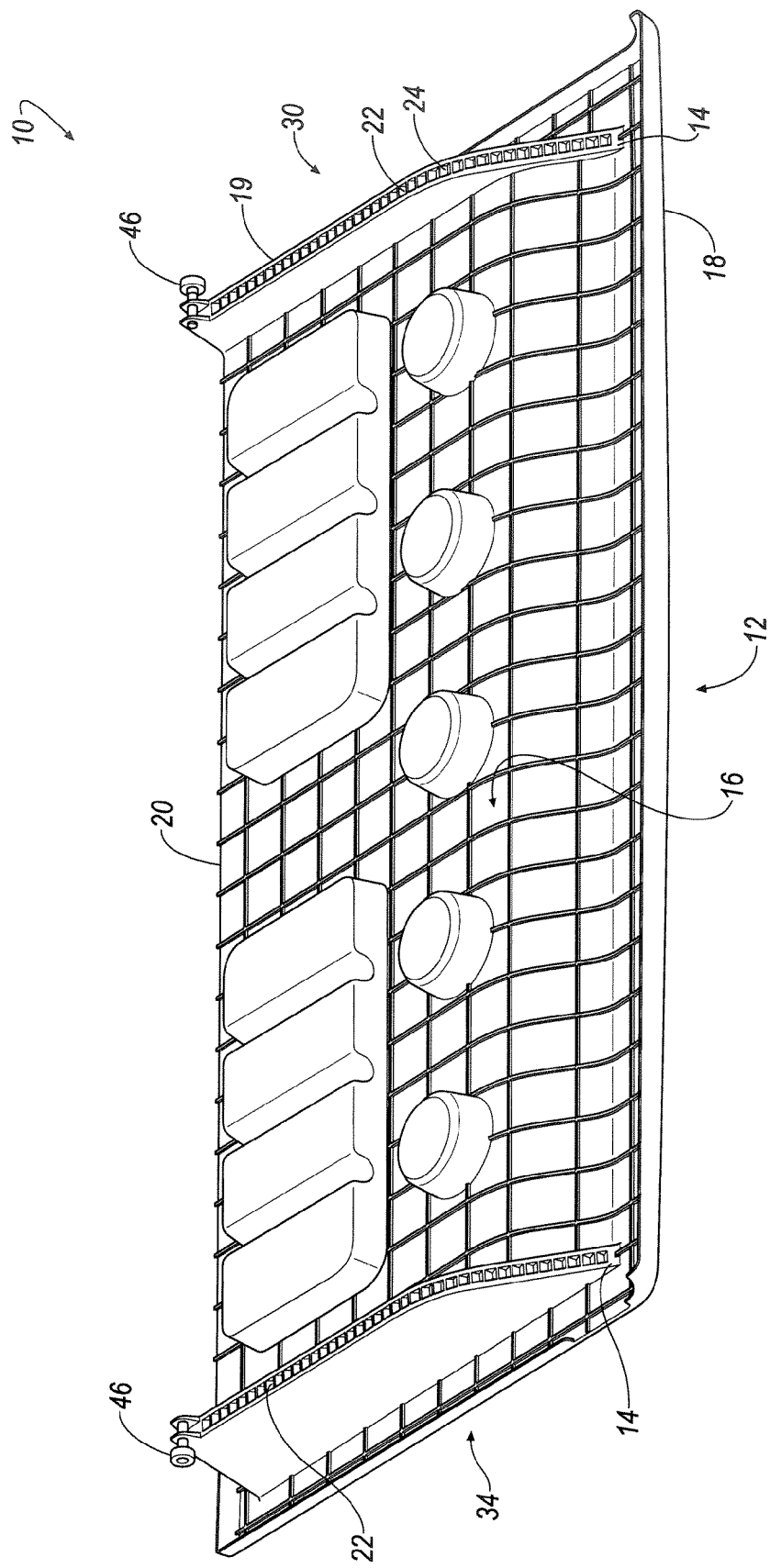
FIG. 1 is a bottom perspective view of a moveable floor assembly of a vehicle.
Figure 3A:
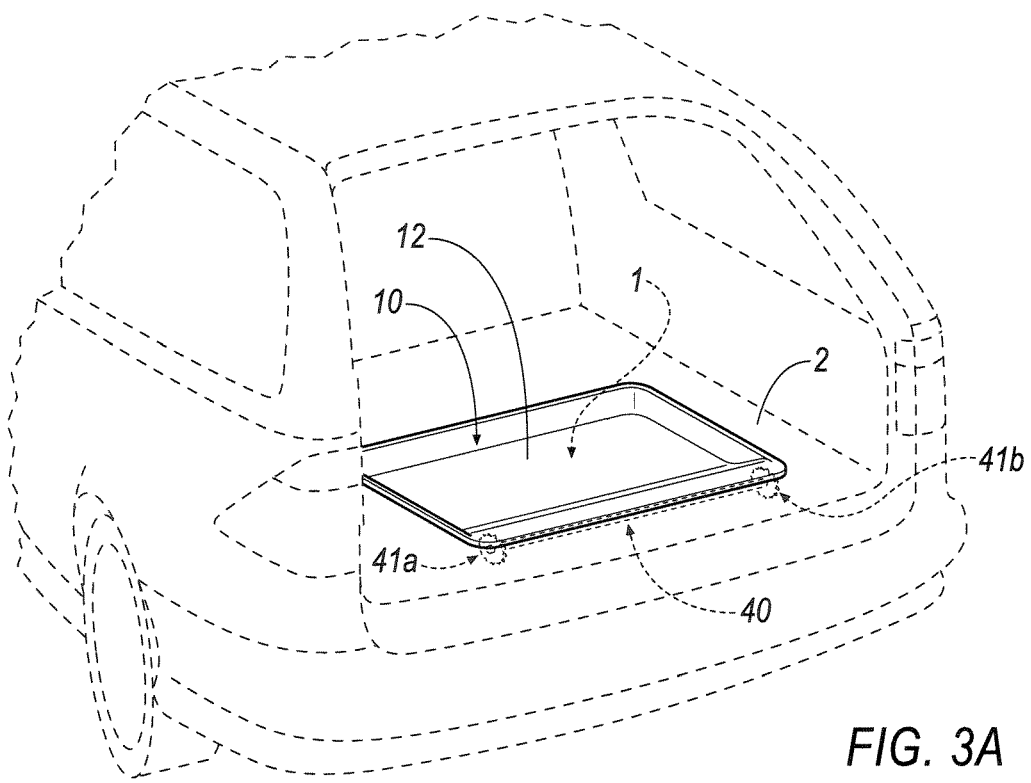
FIG. 3A is an environmental view of a vehicle showing the movable floor assembly in a stowed position.
Figure 3B:
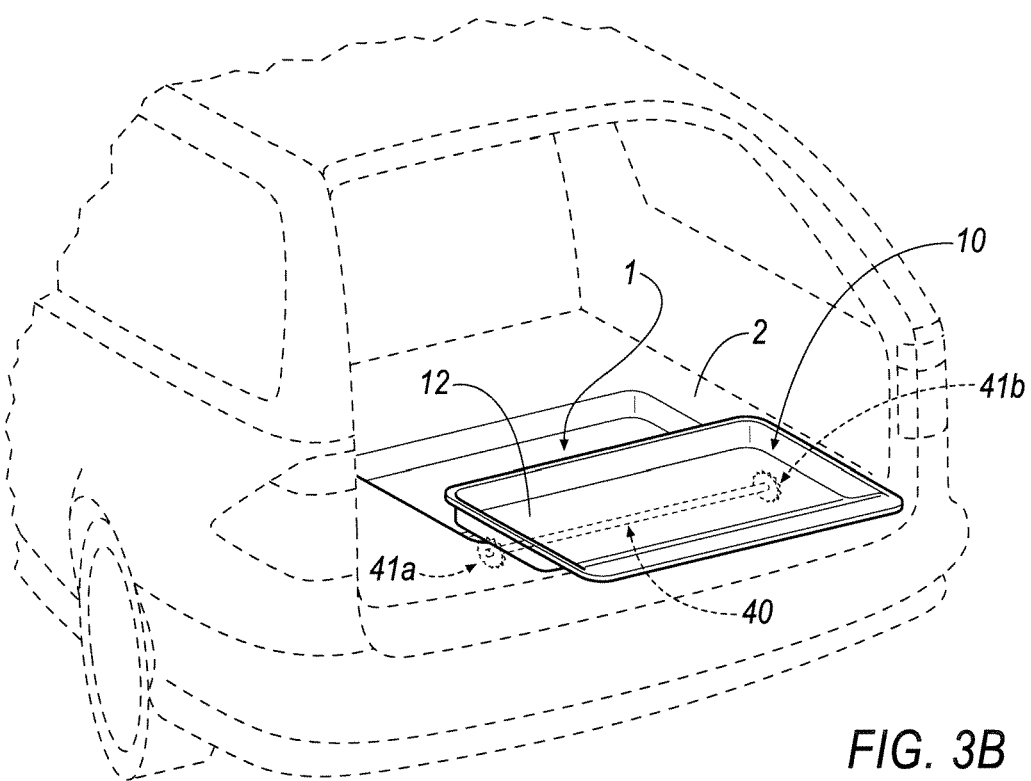
FIG. 3B is an environment view of a vehicle showing the moveable floor assembly in a deployed position.

Referring to FIG. 1, a moveable cargo floor assembly including a cargo floor 12 is shown generally at 10. In an embodiment, the cargo floor assembly 10 is disposed within a vehicle. Referring to FIGS. 3A, 3B, the vehicle includes stowage area 1 in a floor portion 2. Also referring to FIG. 3A, the cargo floor 12 may be arranged in a stowed position in which the entire cargo floor 12 is inside the vehicle and the cargo floor 12 creates an even surface with the floor portion 2 of the vehicle. Referring to FIG. 3B, the cargo floor 12 may be arranged in a deployed position which is any position the cargo floor 12 is in besides the stowed position. In a preferred embodiment, at least a portion of the cargo floor 12 is outside the vehicle when the cargo floor 12 is in the deployed position. In an alternate embodiment, when the cargo floor 12 is in the deployed position the cargo floor 12 is closer to an entrance point of vehicle (not shown) than when in the stowed position but remains inside the vehicle.

The cargo floor 12 has at least one ramp surface 14 that is integrated into a base 16 of the cargo floor 12. The ramp surface 14 is formed at a front portion 18 of the cargo floor 12 and becomes a substantially horizontal surface 19 toward a rear portion 20 of the cargo floor 12. A track 22 is integrated along the ramp surface 14 and horizontal surface 19 from the front portion 18 to the rear portion 20. In a preferred embodiment, the track 22 is formed by a plurality of teeth 24 that extend along the ramp surface 14 and the horizontal surface 19 so that the teeth 24 engage a gear 41$a$/41$b$ (see, e.g, FIG. 2). The teeth 24 are formed by a plurality of vertical extensions from the track 22 that create a recessed area between the vertical extension so that a gear tooth is accepted by the recessed area. Thus, the cargo floor 12 is molded to include the ramp surface 14, the horizontal surface 19, the track 22, and the teeth 24.

In an alternate embodiment, the gear is a frictional element and the ramp surface 14 does not have teeth 24. As the frictional element rotates, the frictional element grips the ramp surface 14 and moves the cargo floor 12 in a similar way as the gear rotates and engages the teeth 24 to move the cargo floor 12.

In a preferred embodiment, the cargo floor 12 and the two components integrated into the cargo floor 12, are made of a long glass fiber filled plastic. The reason for this is that the long glass fiber filled plastic can be shaped through molding processes and has a high strength to weight ratio, in that the plastic material supports or can withstand a much greater force than the weight of the material. This is ideal because the cargo floor 12 is then able to support the weight applied to the cargo floor 12 without adding a great deal of weight to the vehicle, which among other negative affects, would reduce fuel economy. In an alternate embodiment, the cargo floor 12 is made of a plastic sheet, metal, or any other material that has the strength characteristics to withstand the forces applied to the cargo floor 12.

Furthermore, a support frame (not shown) is used to add additional strength to the cargo floor 12. The support frame consists of side frame members (not shown) that extend along the sides of the cargo floor 12, and front and rear frame members (not shown) that extend along the front portion 18 and the rear portion 20 respectively, cross-frame members (not shown) that extend diagonally across the cargo floor 12, or any combination thereof. Likewise, the support frame is preferably made of a long glass fiber filled plastic for the reasons stated above. However, in an alternate embodiment, the support frame is made of a material that is capable to withstand the forces applied to the cargo floor 12.

Figure 2:
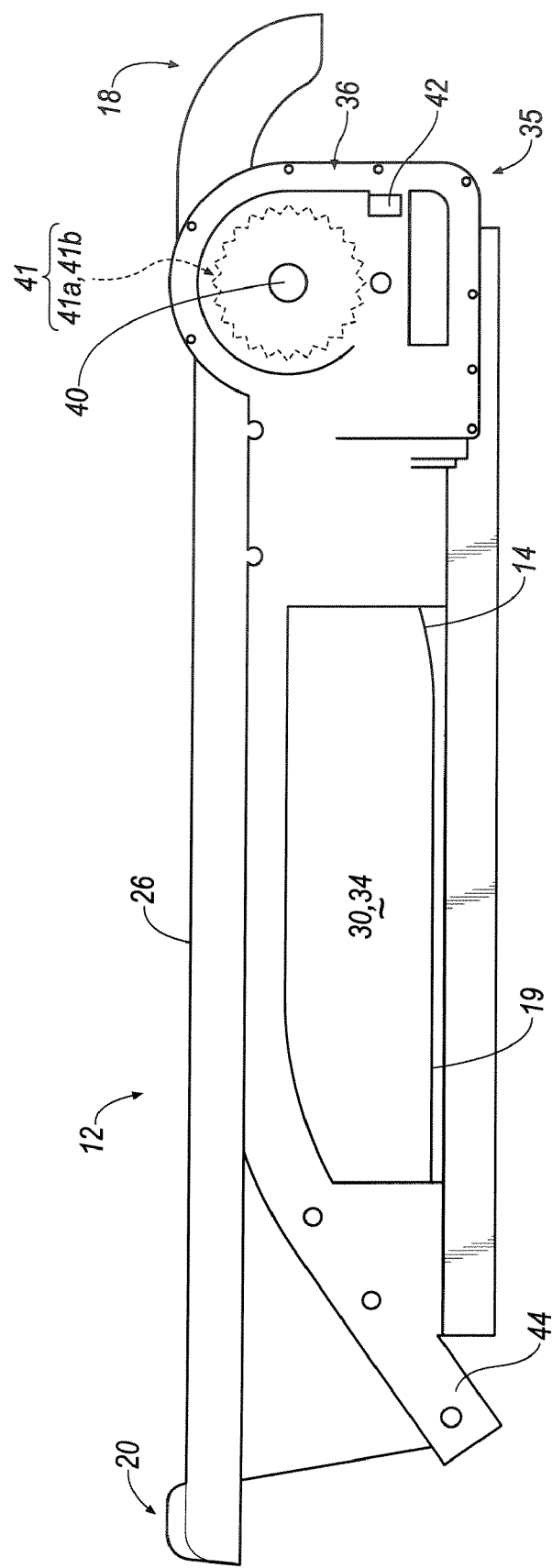
FIG. 2 is a side plan view of the moveable floor assembly of the vehicle.

The vehicle has a sub-floor (not shown) that is under the cargo floor 12 when the cargo floor 12 is in the stowed position. Thus, the sub-floor is at a lower height than the floor portion of the vehicle. In a preferred embodiment, as seen in FIGS. 1 and 2, the ramp surfaces 14 are shaped such that at the front portion 18 the tracks 22 are closer to a top 26 of the cargo floor 12 than at the rear portion 20. Thus, the distance between the track 22 and the sub-floor at the front portion 18 is greater than the distance between the track 22 and the sub-floor at the rear portion 18. Also in a preferred embodiment, the base 16 has a similar contour as the ramp surface 14. Therefore, the base 16 does not cause an obstruction when the cargo floor 12 is moving between a stowed position and a deployed position. For example, if the base 16 did not have a similar contour as the ramp surface 14, as the cargo floor 12 is moved from the stowed position to the deployed position, the base 16 would contact the floor portion of the vehicle because the ramp surface 14 would not raise the base 16 to a height with respect to the floor portion of the vehicle that would allow the base 16 to pass over the floor portion of the vehicle.

In a preferred embodiment, there are two ramp surfaces 14 integrated into the base 16 on opposite ends of the cargo floor 12. Thus, one ramp surface 14 is on a first side 30 of the cargo floor 12 and another ramp surface 14 is on a second side 34 of the cargo floor 12. It is preferred to have the ramp surfaces 14 and the horizontal surfaces 19 on both sides of the floor 30, 34 because then the cargo floor 12 contacts a gear assembly 35 on both sides 30, 34 which creates for a smoother cargo floor 12 movement. The reason for this is because a moving force is applied to the cargo floor 12 by the gear assembly 35 on both sides 30, 34 of the cargo floor 12, and the weight applied to the cargo floor 12 is then evenly distributed about the two ramp surfaces 14 and the two horizontal surfaces 19. However, any number of ramp surfaces 14 and horizontal surface 19 can be used so long as they extend from the front portion 18 to the rear portion 20.

In a preferred embodiment, the gear assembly 35 includes a drive mechanism 36, a pair of gears 41 (including a first gear 41$a$ and a second gear 41$b$), and a drive shaft 40 connecting the gears 41$a$, 41$b$. The drive mechanism 36 is located inside the vehicle and is operably connected to the first gear 41$a$. Thus, each ramp surface 14 has a corresponding gear 41$a$, 41$b$ that is connected to the ramp surface 14 by the teeth 24 of the track 22. In a preferred embodiment, the drive mechanism 36 is a motor that rotates the drive shaft 40 which operably connects a first gear 41$a$ and a second gear 41$b$ with the drive mechanism 36. Thus, the drive shaft 40 extends along the length of the cargo floor 12 so that the first gear 41$a$ and second gear 41$b$ are simultaneously rotating so that the tracks 22 are moving with respect to the first gear 41$a$ and second gear 41$b$ in order to change the position of the cargo floor 12.

In an alternate embodiment, the gears 41$a$, 41$b$ are not connected by the drive shaft 40. Instead, the drive mechanism 36 is operably connected to the first gear 41$a$ so that the first gear 41$a$ is rotated. As the first gear 41$a$ is rotated the first gear 41$a$ moves the cargo floor 10, which causes the second gear 41$b$ to rotate. Thus, the first gear 41$a$ and second gear 41$b$ have a master slave relationship, where the second gear 41$b$ is the slave gear that is driven by the first gear 41$a$.

Furthermore, the drive mechanism 36 is connected to a controller (not shown) which is used to control the drive mechanism 36. Thus, the controller starts and stops the drive mechanism 36 and commands the drive mechanism to rotate the drive shaft in a particular direction. For example, when the controller receives a first signal the controller commands the drive mechanism 36 to rotate the drive shaft 40 in a way that moves the cargo floor 12 from the stowed position to the deployed position. Similarly, when the controller receives a second signal, the controller commands the drive mechanism 36 to rotate the drive shaft in the opposite direction in order to move the cargo floor 12 from the deployed position to the stowed position.

Typically, the controller receives a signal from a person through a wire connection or a wireless signal. For example, a first button (not shown) can be electrically connected to the controller so that the person contacts or depresses the first button in order for the controller to command the drive mechanism to begin rotating the drive shaft in the first direction. A second button (not shown) is then electrically wired to the controller so that when the person contacts or depresses the second button the controller commands the drive mechanism 36 to rotate the drive shaft in the opposite direction so that the cargo floor 12 will move from a deployed position to the stowed position. In an alternate embodiment, the controller receives wireless signals such that the controller will command the drive mechanism 36 in a similar manner as described above with the electrical wire connection. Thus, the person has a transmitter (not shown) in which contains the control buttons for the controller so that the person can activate the controller.

In addition, the vehicle has at least one support channel 44 that has the opposite contour of the base 16. In a preferred embodiment, the support channels 44 are on both the first side 30 and the second side 34 of the cargo floor 12. The cargo floor 12 has a corresponding connector 46 on both sides 30, 34 at the rear portion 20 that connects to the support channel 44. Thus, the support channel 44 and connector 46 remain in contact when the cargo floor 12 moves to and from the stowed position and the deployed position. In a preferred embodiment, the support channel 44 is a C-channel and the connector 46 is a pin having a roller on the end such that the pin and roller slide along the C-channel 44 as the cargo floor 12 is moved by the gear assembly 35.

The support channel 44 and the connector 46 are used to give the cargo floor 12 additional strength in order to support a force that is applied to the top 26 of the cargo floor 12 when the cargo floor 12 is not in the stowed position. In a preferred embodiment, the cargo floor 12 contacts the sub-floor when in the stowed position, and, the support channel 44 and connector 46 are not needed to support the cargo floor 12. Thus, support channel 44 and connector 46 are not used to move the cargo floor 12 with respect to the vehicle. However, the support channel 44 has the opposite contour as the base 16 in order for the connector 46 to stay within the support channel 44 as the cargo floor 12 moves to and from a deployed position and a stowed position. If the support channel 44 did not have the opposite contour as the base 16, the connector 46, being attached to the rear portion 20 cargo floor 12, would not be able to remain in contact with the support channel 44 when the cargo floor 12 changes heights with respect to the floor portion of the vehicle. Thus, the portion of the support channel 44 at the rear portion 20 is lower than the remaining portions of the support channel 44 so that the support channel 44 immediately has an increase in height with respect to the floor portion of the vehicle, whereas the ramp surface 14 and the base 16 change height with respect to the sub-floor at the front portion 18.

Therefore, when the controller 42 receives a signal, the controller activates the drive mechanism 36 which rotates the drive shaft in the desired direction so that the gear grips the track 22 by the teeth 24 in order to move the cargo floor 12 between a stowed position and a deployed position. As the cargo floor 12 moves, the contour of the ramp surface 14 causes the cargo floor 12 to rise to a greater height than what the cargo floor 12 was at when the cargo floor 12 was in the stowed position. Thereafter, the cargo floor 12 moves along the horizontal surface 19 to the desired deployed position. Thus, the cargo floor 12 raises with respect to the floor portion of the vehicle when in the deployed position and then returns to a height that is approximately even with the floor portion when the cargo floor 12 is in the stowed position. As the cargo floor 12 moves between positions the connecter 46 slides along the support channel 44 in order to guide the cargo floor and reduce the weight of force applied to the gears through the track 22.

By having the ramp surfaces 14 and the horizontal surfaces 19 integrated into the base 16, the assembly and manufacturing of the moveable cargo floor assembly of a vehicle 10 is more efficient. Thus, in the preferred embodiment, the cargo floor 12 is installed in the vehicle, and only the gears need to be aligned with the integrated teeth 24 and the connector 46 needs to be operably connected with the support channel 44. In an alternate embodiment, the gears are attached to the cargo floor 12 with the drive shaft so that the assembly would require the drive shaft being operably connected to the drive mechanism 36 and the connector 44 being operably connected to the support channel 42. Thus, the above described assemblies create a more efficient assembly process by reducing the number of parts that need to be connected.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A moveable cargo floor of a vehicle, said vehicle including a stowage area in a floor portion comprising:
    a cargo floor moveably positioned in said stowage area when in a stowage position and being capable of being deployed outside of said stowage area when in a deployed position, and said cargo floor including a base portion;
    at least one ramp surface integrated into said base portion of said cargo floor; and
    at least one track integrated into said base portion, wherein a gear assembly operably engages said at least one track in order to move said cargo floor between said deployed position and said stowed position.

2. The moveable cargo floor of a vehicle of claim 1, wherein said track is integrated into said ramp surface so that said cargo floor is elevated with respect to said floor portion and is out of said stowage area as said cargo floor is moved by said gear assembly engaging said track and said cargo floor is placed in said deployed position.

3. The moveable cargo floor of a vehicle of claim 1 further comprising at least one horizontal surface connected to said ramp surface, wherein a gear moves said cargo floor by said ramp surface to raise the height of said cargo floor with respect to said floor portion, and wherein said gear moves said cargo floor by said at least one horizontal surface to maintain the height of said cargo floor.

4. The moveable cargo floor of a vehicle of claim 1, wherein said at least one track further comprises a first track and a second track, said gear assembly including a first gear for engaging said first track and a second gear for engaging said second track.

5. The moveable cargo floor of a vehicle of claim 4, wherein said gear assembly further comprises a shaft that operably connects said first gear with said second gear, so that when said first gear rotates said shaft rotates said second gear.

6. The moveable cargo floor of a vehicle of claim 3, wherein said gear assembly further comprises a drive mechanism that controls said gear.

7. The moveable cargo floor of a vehicle of claim 6, wherein said drive mechanism comprises a motor that is operably connected to said gear.

8. The moveable cargo floor of a vehicle of claim 6, wherein said drive mechanism comprises a controller, said controller receives signals which command said controller to activate and deactivate said motor and command said motor to rotate in a particular direction, and said signals are at least one of an electrical signal transmitted through a wire and a wireless signal.

9. The moveable cargo floor of a vehicle of claim 1 further comprising at least one support channel that extends along at least one side of said cargo floor and is connected to the vehicle, wherein said cargo floor has at least one connector which contacts said at least one support channel.

10. The moveable floor of a vehicle of claim 9, wherein said support channel is a C-channel and said connector is a pin having a roller, such that said pin and roller slide along said support channel as said cargo floor is moving between said deployed position and said stowed position.

11. A moveable cargo floor of a vehicle, said vehicle including a stowage area in a floor portion comprising:
- a cargo floor moveable between a stowed position and a deployed position, wherein at least a portion of said cargo floor extends beyond said vehicle when in a deployed position, and said cargo floor is inside vehicle when in a stowed position, and said cargo floor including a base portion;
- at least one ramp surface, wherein said at least one ramp surface is integrated into said base portion, and said at least one ramp surface includes a track integrated with said at least one ramp surface;
- at least one horizontal surface connected to said ramp surface, wherein said at least one horizontal surface is integrated into said base portion, and wherein said track is also integrated with said at least one horizontal surface; and
- at least one gear assembly that is fixed with respect to said vehicle, wherein at least one gear contacts said track of said ramp surface for moving said cargo floor to and from said deployed position and said stowed position, such that said cargo floor is at a greater height with respect to said floor portion when in said deployed position than when said cargo floor is in said stowed position.

12. The moveable cargo floor of a vehicle of claim 11, wherein said at least one ramp includes a first ramp and a second ramp, wherein the at least one horizontal surface includes a first horizontal surface and a second horizontal surface, wherein said at least one gear includes a first gear and a second gear, such that said first gear engages said track of the first ramp and the second horizontal surface and said second gear engages said track of the second ramp and the second horizontal surface, and said first gear and said second gear are operably connected by a shaft so that when said first gear rotates said shaft rotates said second gear.

13. The moveable cargo floor of a vehicle of claim 11, wherein said gear assembly further comprising a drive mechanism that controls said at least one gear, wherein said drive mechanism comprises a motor that is operably connected to said at least one gear and a controller that receives signals which command said controller to activate and deactivate said motor and command said motor to rotate in a particular direction.

14. The moveable cargo floor of a vehicle of claim 13, wherein said signals are at least one of an electrical signal transmitted through a wire and a wireless signal.

15. The moveable cargo floor of a vehicle of claim 11 further comprising at least one support channel that extends along at least one side of said cargo floor and is connected to a vehicle, wherein said cargo floor has at least one connector which contacts said at least one support channel.

16. The moveable cargo floor of a vehicle of claim 15, wherein said support channel is a C-channel and said connector is a pin having a roller, such that said pin and roller slide along said support channel as said cargo floor is moving to and from said deployed position and said stowed position.

17. A moveable cargo floor of a vehicle, said vehicle including a stowage area in a floor portion comprising:
- a cargo floor moveable between a stowed position and a deployed position, wherein at least a portion of said cargo floor extends beyond said vehicle when in a deployed position, wherein said cargo floor is located inside said vehicle when the cargo floor is in a stowed position, wherein said cargo floor includes a base portion;
- a pair of ramp surfaces including a first ramp surface and a second ramp surface integrated into said base portion of said cargo floor;
- a pair of horizontal surfaces connected to said pair of ramp surfaces, wherein said pair of horizontal surfaces are integrated into said base portion;
- a pair of gears including a first gear and a second gear that are connected to said vehicle, wherein said pair of gears contact said pair of ramp surfaces;
- a drive mechanism that controls said pair of gears, wherein said drive mechanism comprises a motor that is operably connected to said pair of gears and a controller that receives signals which command said controller to activate and deactivate said motor and command said motor to rotate in a particular direction;
- a pair of support channels, wherein a first support channel extends along a first side of said cargo floor and a second support channel extends along a second side of said cargo floor and said first support channel and said second support channel are connected to said vehicle, wherein said cargo floor has a pair of connectors which contact said pair of support channels so that a first connector contacts said first support channel and a second connector contacts said second support channel; and
- a pair of tracks, wherein said tracks are integrated into said pair of ramp surfaces, and the first gear engages a first track on the first ramp surface and the second gear engages a second track on the second ramp surface in order to move said cargo floor to and from said deployed position and said stowed position, such that the height of said cargo floor with respect to said floor portion is increased and decreased as said floor is moved by said first gear and said second gear.

18. The moveable cargo floor of a vehicle of claim 17, wherein said first gear and said second gear are operably connected by a shaft so that when said first gear rotates said shaft rotates said second gear.

19. The moveable cargo floor of a vehicle of claim 17, wherein said signals are at least one of an electrical signal transmitted through a wire and a wireless signal.

20. The moveable cargo floor of a vehicle of claim 17, wherein said support channel is a C-channel and said connector is a pin having a roller, such that said pin and roller slide along said support channel as said floor moving to and from said deployed position and said stowed position.

* * * * *